United States Patent [19]

Howard

[11] Patent Number: 4,600,804

[45] Date of Patent: Jul. 15, 1986

[54] CRIMP CONNECTOR HAVING GEL BETWEEN ENVELOPE AND CRIMP BODY

[75] Inventor: Peter Howard, Mountain View, Calif.

[73] Assignee: Raychem Corporation, Menlo Park, Calif.

[21] Appl. No.: 698,648

[22] Filed: Feb. 6, 1985

[51] Int. Cl.[4] .............................................. H02G 15/08

[52] U.S. Cl. ................................ 174/84 C; 339/97 C; 339/115 C

[58] Field of Search ................... 174/84 C; 339/97 C, 339/114, 115 R, 115 C

[56] References Cited

U.S. PATENT DOCUMENTS

| | | | |
|---|---|---|---|
| 3,087,606 | 4/1963 | Bollmeier et al. | 339/115 C |
| 3,410,950 | 11/1968 | Freudenberg | 174/84 C |
| 3,507,977 | 4/1970 | Pusey | 339/115 C |
| 3,539,708 | 11/1970 | D'Ascoli et al. | 339/97 C X |
| 3,814,836 | 6/1974 | Neale, Sr. | 174/84 C |
| 3,839,595 | 10/1974 | Yonkers | 174/84 C X |
| 4,065,637 | 12/1977 | Allison | 174/84 C X |
| 4,118,596 | 10/1978 | Bassett et al. | 174/84 C X |

FOREIGN PATENT DOCUMENTS 2133026 7/1984 United Kingdom .

*Primary Examiner*—Arthur T. Grimley
*Assistant Examiner*—Morris H. Nimmo
*Attorney, Agent, or Firm*—Dennis E. Kovach; T. Gene Dillahunty; Herbert G. Burkard

[57] ABSTRACT

An electrical crimp connector includes a plurality of dimples disposed between an outer surface of a crimping body and an inner surface of a polymeric envelope, with an insulating gel being disposed in a space between the crimping body and the envelope formed by the dimples. Upon crimping the connector, the insulating gel is forced into an interior cavity of the connector thus insulating wires being crimped.

15 Claims, 1 Drawing Figure

CRIMP CONNECTOR HAVING GEL BETWEEN ENVELOPE AND CRIMP BODY

BACKGROUND OF THE INVENTION

1. Field of the Invention

The present invention relates to an electrical crimp connector for electrically connecting wires.

2. Description of the Prior Art

Prior art crimp connectors typically include an insulation piercing sleeve surrounded by a crimping body which is surrounded by a polymeric sleeve, and electrical connection between wires inserted into a cavity of the insulation piercing sleeve is achieved by crimping an exterior surface of the envelope with any appropriate tool, such as pliers. A problem exists with such connectors in that an undue amount of force is required to adequately crimp the insulation piercing sleeve so as to make adequate electrical contact with the wires, and a further problem is that the wires oftentimes corrode. In an attempt to solve the corrosion problem, it has previously been proposed to fill an interior cavity of the connector with an insulating grease, and this solution is disadvantageous since it makes insertion of the wires into the connector difficult. In addition, the grease oftentimes tends to flow out of the connector thus exposing the wires to corrosion.

SUMMARY OF THE INVENTION

Accordingly, it is an object of the present invention to eliminate the above-noted drawbacks, and to provide a crimp connector which requires a relatively low amount of force to crimp and electrically connect wires therein and which positively provides excellent corrosion resistance to the wires subsequent to being crimped.

These and other objects are achieved by an electrical crimp connector which includes an insulation piercing sleeve surrounded by a metal crimping body surrounded by an insulating envelope. Dimples are formed between an outer surface of the crimping body and an inner surface of the envelope thus forming a space therebetween, and an insulating gel having a three dimensional network is disposed within the space. The crimping body and insulation piercing sleeve each have holes formed in side walls thereof forming paths for the gel to enter a central cavity of the insulation piercing sleeve upon crimping the connector. Accordingly, upon crimping the connector, the gel in the space is forced into the cavity thus protecting wires being crimped therein. In addition, the dimples form areas of increased force concentration on the crimping body and insulation piercing sleeve, thus requiring a relatively low amount of crimping force to make good electrical contact with the wires.

DESCRIPTION OF THE PREFERRED EMBODIMENTS

Figure 1:
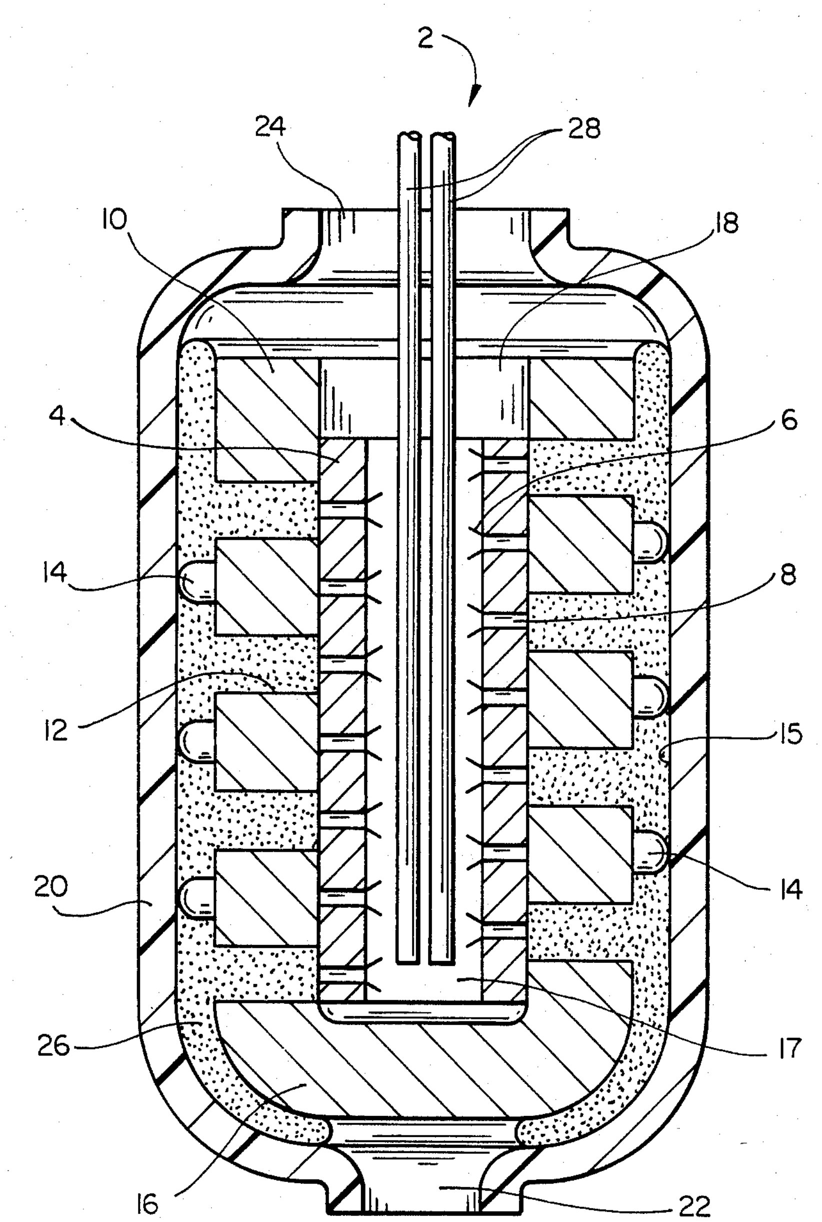
FIG. 1 is a cross-sectional view of one preferred embodiment of the invention.

FIG. 1 illustrates a cross-sectional view of one embodiment of the invention. A crimp connector 2 includes a metal insulation piercing sleeve 4 formed in a substantially cylindrical configuration, the insulation piercing sleeve 4 including insulation piercing barbs 6 extending radially inward. The barbs 6 function to establish electrical connection with wires or conductors 28 inserted into the crimp connector 2 when the crimp connector is crimped by any appropriate tool, the barbs 6 piercing any insulation layers on the wires 28, though the wires 28 may not necessarily have insulation layers thereon to be pierced.

The sleeve 4 further includes a plurality of holes 8 which extends through side walls thereof. The sleeve 4 is surrounded by a metal crimping body 10, which also has a plurality of second holes 12 therein some of which at least communicate with the holes 8. The crimping body 10 is also substantially cylindrically shaped, and has one closed axial end 16 and one open axial end 18. The crimping body 10 is surrounded by an insulating envelope 20 having first and second open axial ends 22, 24, the end 24 being sized so as to accommodate insertion of the wires 28. Dimples 14 are formed between the crimping body 10 and the envelope 20 so as to form a space 15 therebetween, and an insulating gel 26 is disposed in the space 15.

The gel 26 functions to protect the wires 28 from adverse environmental effects, such as corrosion, and accordingly can comprise a grease or a gel. Though greases can be used, a gel comprising a three dimensional network is desirable to provide better environmental protection. In particular, the gel can be a urethane, silicone, or non-silicone liquid rubber which has low or no unsaturation prior to being cross-linked, with the liquid rubber then being cross-linked to form the gel. Gels such as these are described in copending application Ser. Nos. 434,011 filed Oct. 12, 1982; 504,000, filed June 13, 1983; 656,555 filed Aug. 31, 1984; and U.S. Pat. No. 4,576,557, all assigned to the assignee of the present invention, the disclosures of which are incorporated herein by reference. In particular, the gel preferably has a cone penetration value between 100 and 350 ($10^{-1}$ mm), more preferably between 200 and 300 ($10^{-1}$ mm), and most preferably between 240 and 270 ($10^{-1}$ mm), and an ultimate elongation of at least 200%. As used herein, cone penetration values are as measured by ASTT D-937-77, and ultimate elongations are as measured by ASTM D-412. Gels of the type described have the property that they tend to maintain a cohesive structure even when subjected to crimping forces, and accordingly do not tend to run and ooze out of the connector as would a grease which has no inherent cohesive three dimensional network structure. Accordingly, the gel 26 is capable of providing an excellent environmental protection for the wires 28, as well as other component parts of the connector 2.

The dimples 14, spacing 15, and holes 8, 12 are all sized such that upon crimping the connector by any appropriate tool subsequent to inserting the wires 28 therewithin, the gel 26 is forced out of the space 15 to a sufficient degree so as to fill or substantially fill the cavity 17 defined by the insulating piercing sleeve 4 so that the wires 28 are totally protected from the environment. In FIG. 1, all dimensions have been greatly exaggerated and not drawn to scale so as to facilitate an understanding of the structure of the various components being illustrated.

A further advantage of the dimples 14 is that they provide areas of stress or force concentration upon the connector 2 being crimped, the force and stresses being concentrated on particular portions of the insulation piercing sleeve 4 substantially radially in line with the dimples 14, and therefor higher pressures are generated in localized areas giving the connector a greater cutting force, rather than the much broader lower pressure generated with prior art connectors which lack such dimples.

Though it is possible to fill the entire connector including the cavity 17 with the gel 26 during manufacturing, and to provide the gel within space 15 between the crimping body 10 and the insulating sleeve 20, it may be desirable to keep the cavity 17 void of gel prior to crimping which has the advantage of making it easier to install the wires 28 within the cavity 17. One way of insuring that gel 26 is not in the cavity 17 prior to crimping is to place a layer of gel around an exterior surface of the crimping body 10 prior to applying the sleeve 20 therearound. If gel is desired to occupy an interior of the connector 2 through, one possible way of accomplishing this would be to simply inject a gel precursor into the connector subsequent to its manufacture, such an injection being accomplished through an open axial end 24 of the envelope, with an opposite axial end 22 of the envelope being available for discharging excess gel injected. The provision of the opposite open axial end 22 of the envelope also allows a ready means of inserting a test probe within the connector 2 so as to make contact with the closed axial end 16 of the crimping body 10 to determine if electrical contact with the wires 28 has occurred. To this end, a silicone gel is desirable since penetration thereof by a test probe is possible, and the silicone gel will recover to form an excellent environmental seal for the opening 22 subsequent to removal of the probe.

The dimples 14 can be integrally formed with the crimping body 10 upon shaping thereof, stamping being an appropriate procedure, or alternatively the dimples 14 can be formed on the insulating envelope 20. Yet further, the dimples 14 can comprise a separate element which is independently formed on the envelope 20 or the crimping body 10 and not an integral part thereof. Finally, if desired, dimples 14 can be formed on both the crimping body 10 and envelope 20. Preferably, the envelope 20 is a recoverable member, preferably a heat-recoverable member which is recovered around the crimping body 10, such heat-recoverable members being well known in the art.

What is claimed is:

1. An electrical crimp connector, comprising:
means for piercing electrical conductors;
a crimping body surrounding the piercing means;
an insulating envelope disposed around the crimping body;
means for forming a space between an outer surface of the crimping body and an inner surface of the insulating envelope; and
a gel disposed within the space.

2. The connector of claim 1, the crimping body, piercing means, and insulating sleeve having a substantially cylindrical shape, one axial end of the crimping body being closed and the other axial end being open, the envelope having both axial ends open.

3. The connector of claim 1, the crimping body and piercing means having holes through side walls thereof to allow the gel to flow into a central cavity of the piercing means upon crimping of the connector.

4. The connector of claim 3, the piercing means being capable of piercing through insulation of an electrical conductor, the crimping body being made of metal, and the insulating envelope being made of a polymeric material.

5. The connector of claim 1, the gel being disposed in the space between the crimping body and the envelope by injecting a gel precursor under pressure at one axial end of the envelope, excess gel precursor leaving the connector through an opposite open axial end of the envelope.

6. The connector of claim 3, the envelope being recoverable and being recovered around the crimping body.

7. The connector of claim 5, the gel precursor being cured subsequent to being injected into the envelope.

8. The connector of claim 1, the forming means comprising dimples disposed between the crimping body and the envelope.

9. The connector of claim 8, the dimples being an integral part of the crimping body.

10. The connector of claim 8, the dimples being an integral part of the envelope.

11. The connector of claim 1, the gel having a cone penetration between 100 and 350 ($10^{-1}$ mm), and an ultimate elongation of at least 200%.

12. The connector of claim 11, the cone penetration being between 200 and 300 ($10^{-1}$ mm).

13. The connector of claim 12, the cone penetration being between 240 and 270 ($10^{-1}$ mm).

14. The connector of claim 1, the gel being disposed within the space in such a manner that a central cavity of the piercing means is substantially void of the gel prior to crimping the connector.

15. The connector of claim 1, the envelope having an open axial end confronting a closed axial end of the crimped body for allowing access to the crimping body so that a test probe can be connected to the crimping body to determine electrical connection with wires being crimped.

* * * * *